Oct. 16, 1945.          W. MEYER          2,387,085
SAFETY WINDOW SEAT
Filed March 15, 1945                2 Sheets-Sheet 1

INVENTOR
W. Meyer
BY  F. Ledermann
ATTORNEY

Oct. 16, 1945.    W. MEYER    2,387,085
SAFETY WINDOW SEAT
Filed March 15, 1945    2 Sheets-Sheet 2

INVENTOR
W. Meyer
BY J. Ledermann
ATTORNEY

Patented Oct. 16, 1945

2,387,085

UNITED STATES PATENT OFFICE 2,387,085

SAFETY WINDOW SEAT

Willy Meyer, Jamaica, N. Y.

Application March 15, 1945, Serial No. 582,831

4 Claims. (Cl. 304—24)

This invention relates to window seats, and aims to provide a novel, practical and useful safety window seat which may be readily mounted within the window frame so that a person may sit in the frame, particularly for the purpose of cleaning the outside surfaces of the window glass.

Another object of the invention is the provision of a window seat having releasable and adjustable locking means for securely locking the seat in place on the window sill.

A still further object of the invention is the provision of adjustable locking and supporting means whereby the seat may be accommodated to different types and sizes of window frames and sills.

The above and other objects will become apparent in the following detailed description, wherein characters of reference refer to like-numbered parts on the accompanying drawings. It is to be noted that the drawings are intended for the purpose of illustration only, and that it is neither intended nor desired to limit the invention necessarily to the specific details of construction shown excepting insofar as they may be deemed essential to the invention.

Referring briefly to the drawings, Fig. 1 is a plan view of the window seat.

Figure 1:
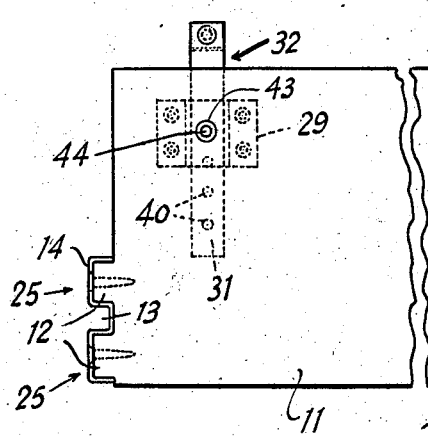
Figure 2:
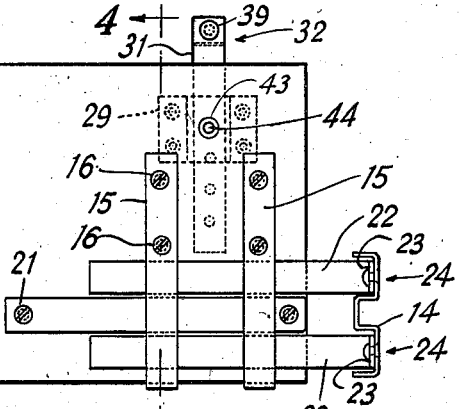
Fig. 2 is a front elevational view of the same.
Figure 2:
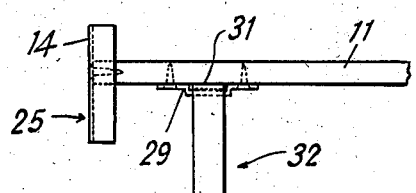
Figure 4:
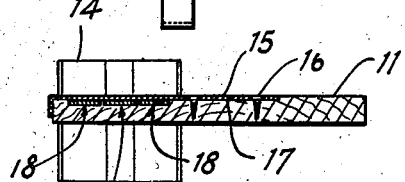
Fig. 4 is a sectional view taken on the line 4—4 of Fig. 1.
Figure 3:
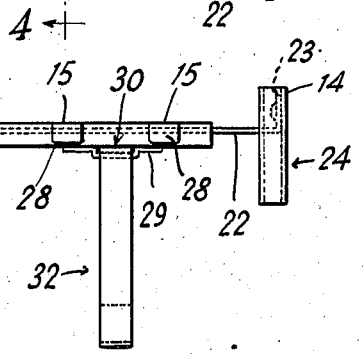
Fig. 3 is a fragmentary bottom plan view of the seat.
Figure 3:
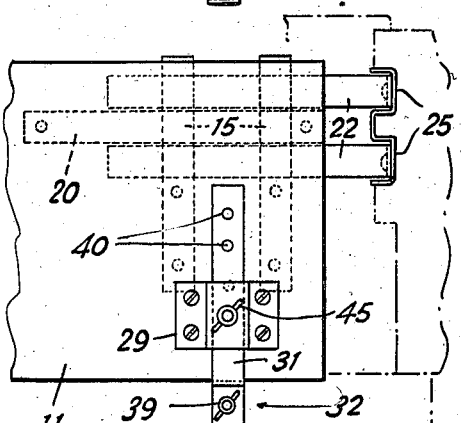

Referring in detail to the drawings, the numeral 11 indicates a panel, board, or other seat-providing member, having spaced teeth 12 projecting from one side thereof near the forward edge of the board, with a space or notch 13 therebetween. A shaped strip of metal or other suitable strong material, 14, is secured against and covers both the teeth 12 and the surface of the notch 13.

Near the other side of the board 11, a pair of parallel longitudinal spaced springy straps 15 are anchored at their inner ends by screws 16 or the like, and they are countersunk in grooves 17 cut into the board. At right angles to the grooves 17 and in alignment with the teeth 12, spaced grooves 18 are cut into the board, and a third groove 19 is cut therebetween. A rigid strip 20 is secured, as by screws 21, in the groove 19 and serves as a spacer or separator. Instead of the three grooves 18 and 19, a single groove might be provided of the same width as the total width of the three grooves, and the separator 20 will then serve as a spacer and guide between the two rigid slides 22 which register slidably in the grooves 18. The extremities 23 of the slides 22 are turned up, and thereto is secured a second shaped strip 14, identical to that previously mentioned, which forms teeth 24 on the slides 22 and joins the slides rigidly together; the teeth 24 are thus identical to the teeth 25 formed by the covering 14 over the teeth 12.

The width of each tooth 24 and 25 is such that the tooth will fit freely into one of the window grooves 26 of the window frame, and the space between the teeth 24 as well as that between the teeth 25 is such that the parting lath 27 will register in the groove or notch 13. Pressure of the straps 15, whose extremities 28 are bent down against the board edge, against the slides 22, restrains the slides frictionally in any extended or retracted position.

Figure 8:
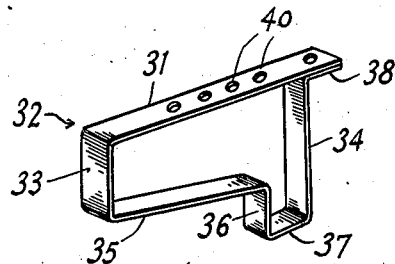
Figs. 8, 9 and 10 are perspective views of details of the seat.
Figure 9:
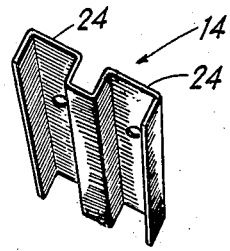
Figure 10:
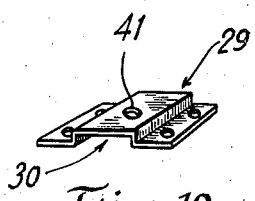

Near each side of the board 11, against the undersurface thereof, guide brackets 29 are secured near the rear edge of the board, having longitudinal channels 30 thus provided between the bracket and the board. Slidably and removably mounted in these channels are the arms, rectangular in cross-section, 31, of rear supports or legs 32. Each leg 32 is formed of a single length or strip of metal or the like bent into substantially the shape shown in Fig. 8, to provide besides the arms 32 which are free at one end, uprights 33 and 34 and 36, an inclined section 35, a horizontal section or foot 37, and a horizontal lip 38 which lies against the free end of the arm 31 and is normally secured thereto by a screw bolt and nut 39 passing through holes therein. A series of spaced holes 40 is provided in the arms 31. A hole 41 extends through the bracket 29, aligned with a hole 42 through the board 11; a nut 43 is imbedded in the upper surface of the board around the hole 42, receptive of a screw 44 having a wing grip 45. It is apparent that the members 31 may thus be moved longitudinally inward or outward and releasably locked in any position with the bolt 44 passing through one of the holes 40.

Figure 5:
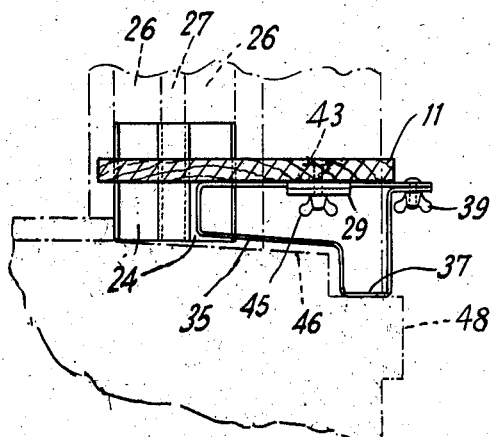
Fig. 5 is an end elevational view of the seat, illustrating its application to one type of window sill.
Figure 6:
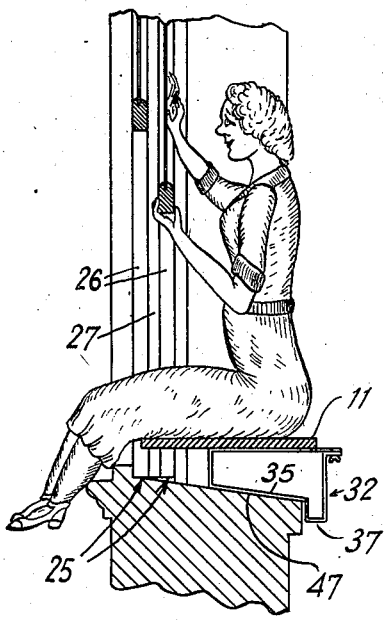
Fig. 6 is a side elevational view of the seat applied to another type of window sill and illustrating its utility in cleaning the outside surface of the window glass.
Figure 7:
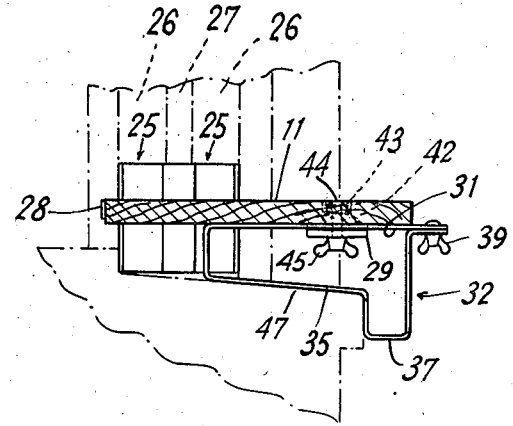
Fig. 7 is an enlarged elevational view of the seat and sill of Fig. 7.

There are two common types of window construction, which are illustrated in Fig. 5, showing one type, and Figs. 6 and 7, showing the other type, the former being more common in brick buildings and the latter in frame structures. In the former type, the stone outer sill 48 lies at a level to prevent the sloping section 35 of the seat support from contacting the sloping intermediate sill 46, and when the seat is applied to this type of window its outer edge is supported by the foot 37 resting on the sill 45, as shown in Fig. 5. In the other type of sill, the sloping outer sill 47 supports the sloping section 35 by direct contact, as shown in Figs. 6 and 7, with the foot 37 extending clear of the sill.

In mounting the seat in a window, the slides 22 are first pushed back so that the toothed edge of the seat may be properly positioned, with the teeth 25 inserted into the window grooves 26 on one side of the window frame; then the slides 22 are moved outward to cause the teeth 24 to register in the grooves 26 on the opposite side of the window frame. The resilient frictional engagement between the straps 15 and the slides assures frictional securement of the slides in their extended position; but if desired, additional means, not shown, for releasably locking the slides in extended position may readily be provided. Such means, however, should not be essential, since the prime function of the engagement of the teeth in the window frame grooves is to prevent slipping of the seat in a horizontal direction in an outward direction, although the lower extremities of the teeth do rest on the frame bottom and carry some weight of the person on the seat.

The support members 32 are readily adjustable longitudinally with respect to their positions on the board 11, to adapt the seat to windows having sills of various dimensions. To position these supports farther inward or outward, it is simply necessary to release the bolts 44 and remove them, then move the member 32 inward or outward by sliding the arm 31 through the channel 30 of the bracket 29 until the nearest hole 40 at the desired new position coincides with the hole 42, then reinserting and tightening the bolt. This means of adjustable securement of the support to the board 11 eliminates any possibility of slippage of the support from the board and thereby provides an important element of safety and security. When it is desired to remove the support 32 entirely, the bolt assembly 39 is also removed and the arm 31 can then be slipped clear of the bracket 29. This may be desirable in order to replace the supports with new ones of different dimensions.

Where the windows of a house or building are all of one type and size, a single seat unit as above set forth, may be assembled and carried from window to window for use as needed. If the windows vary in size, particularly in horizontal depth between inner and outer sills, as many seat units as there are different size windows may be used, or the same unit may be adjusted in the manner set forth to accommodate it to the various sizes of windows.

The window seat described provides a comfortable horizontal surface (which might even, if desired, be gouged out for form, or cushioned) for a person cleaning the outer window surfaces, and thus not only provides a comfortable way of cleaning the windows but also provides positive and complete safety and security. The interengagement of the teeth 24 and 25 in the window grooves 26 eliminates any possibility of loosening or slipping of the seat. The seat thus provides a very useful and practical function whereby the labor of the housewife or of window cleaners in general is substantially reduced and the danger usually involved is entirely disposed of.

As previously stated, the invention herein illustrated and described serves merely to offer one way in which the objects set forth may be achieved, but structural variations and modifications may be made as desired to enhance the simplicity of appearance and the general marketability of the seat. For instance, the straps 15 and slides 22 might be completely concealed within the body of the board 11. Such considerations, however, do not bear upon the invention per se, and it is therefore desired to include as part of the invention whatever variations and modifications may be made within the spirit and scope of the invention.

I claim:

1. In combination with a window frame and the sill thereof, a window seat comprising a board or the like, said board having teeth projecting from one side thereof engageable in the sash grooves of said frame on said side, said board having an elongated member slidably mounted thereon on the other side thereof having spaced teeth on the outer end thereof in alignment with said first-named teeth and engageable in the sash grooves on the other side of said frame, strap like resilient members secured at one end to said board and free at the other end and extending over and across said slidable member at right angles thereto, said resilient members engaging said slidable member to restrain said slidable member against inadvertent sliding on said board, and sill supports on said board.

2. In combination with a window frame and the sill thereof, a window seat comprising a board or the like, said board having teeth projecting from one side thereof engageable in the sash grooves of said frame on that side, said board having a pair of spaced elongated members slidably mounted thereon in mutually parallel relationship and in alignment with said teeth and on the other side of said board, a rigid serrated strip secured to the ends of said members thereby providing teeth thereon engageable in the sash grooves on said other side of said frame, resilient means frictionally engaging said members to restrain the same against inadvertent sliding on said board.

3. In combination with a window frame and the sill thereof, a window seat comprising a board or the like, said board having teeth projecting from one side thereof engageable in the sash grooves of said frame on that side, spaced slidable members mounted on said board on the other side thereof in alignment with said teeth and having teeth on their extremities engageable with said sash grooves on said other side of the frame, said board having supports on the bottom thereof adapted to rest on said sill, and resilient strap-like members anchored at one end to said board frictionally engaging said slidable members and extending at right angles to the latter.

4. In combination with a window frame and the sill thereof, a window seat comprising a board or the like having teeth projecting from one side thereof engageable in the sash grooves of said frame on that side, said board having a pair of spaced parallel elongated members slidably mounted thereon on the other side thereof in alignment with said teeth, a rigid serrated strip having tooth-shaped corrugations formed therein mounted on the outer ends of said members at right angles to said board thereby providing teeth on said members engageable with the sash grooves on the other side of said frame, resilient means frictionally engaging said members and restraining the same against sliding on said board, and supports extending downward from said board adapted to rest on said sill.

WILLY MEYER.